July 22, 1924.
S. HAGOPIAN
PLANT PULLER
Filed March 12, 1923
1,502,246
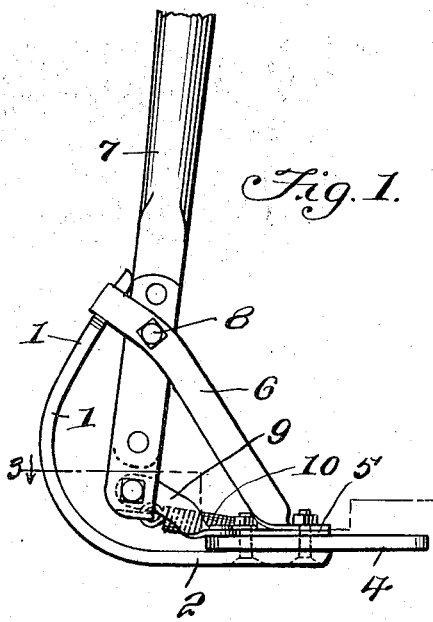
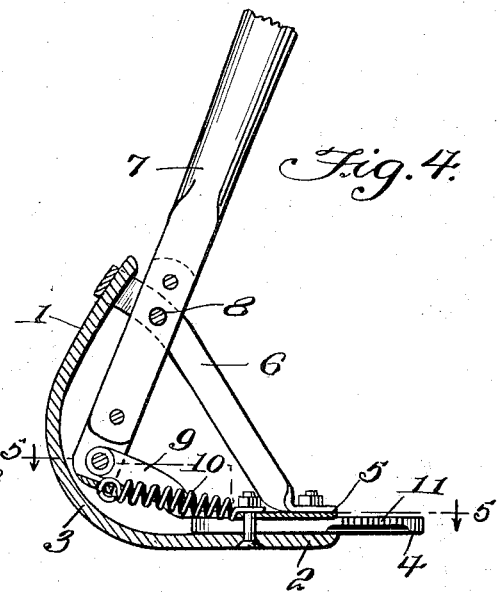
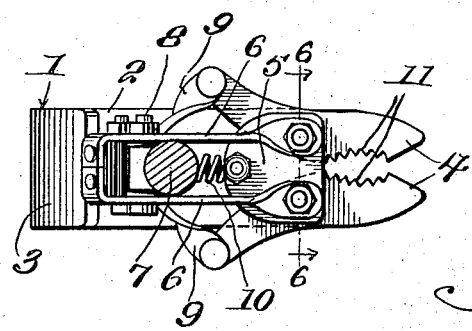
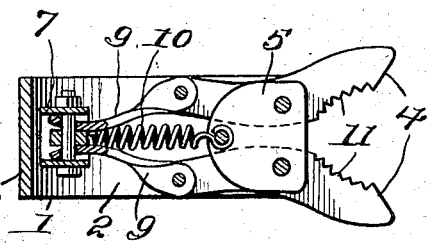
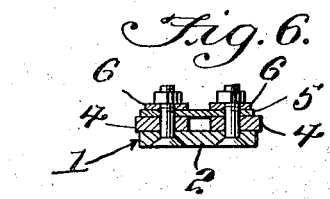
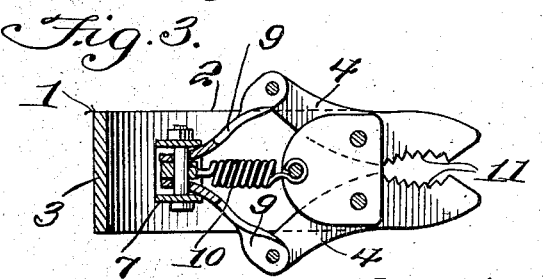
Simon Hagopian
INVENTOR
BY Victor J. Evans
ATTORNEY
WITNESS:

Patented July 22, 1924.

1,502,246

UNITED STATES PATENT OFFICE.

SIMON HAGOPIAN, OF PETALUMA, CALIFORNIA.

PLANT PULLER.

Application filed March 12, 1923. Serial No. 624,530.

*To all whom it may concern:*

Be it known that I, SIMON HAGOPIAN, a citizen of the United States, residing at Petaluma, in the county of Sonoma and State of California, have invented new and useful Improvements in Plant Pullers, of which the following is a specification.

This invention relates to a plant puller, the general object of the invention being to provide a device which is provided with jaw members for gripping the plant and a handle for actuating the jaw members and for moving the device to cause the members to pull the plants from the ground.

Another object of the invention is to provide the device with a curved base for engaging the ground and which can be rolled by the handle to cause the jaw members to pull the plant from the ground.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the invention.

Figure 2 is a plan view.

Figure 3 is a section on line 3—3 of Figure 1.

Figure 4 is a view showing how the device is used.

In these views 1 indicates the base which is provided with a flat part 2 and a curved part 3. A pair of jaw members 4 are pivoted to the free end of the flat part, the pivots passing through a plate 5 which is arranged above the jaw members and to which are connected the braces 6 which are connected with the upper end of the base 1. A handle 7 is pivoted to the braces, as shown at 8, adjacent the upper ends, and said handle is connected with the inner ends of the jaw members by the links 9. A spring 10 tends to hold the jaw members in closed position and the handle in a straight position. The jaw members are provided with teeth 11 for preventing them slipping from the plant.

From the above it will be seen that by placing the flat part of the base upon the ground and pressing the upper end of the handle towards the plant to be pulled the lower end of the handle will be moved towards the curved part of the base so that the links will open the jaws and then the device can be slid forwardly to place the plant between the jaw members. The handle is then released so that the jaw members will close upon the plant and then by rocking the base upon its curved part by the handle the jaws will be lifted and thus pull the plant from the ground. The plant is then released from the jaw members by rocking the device forwardly and thus cause the handle to move the jaw members to open position.

It will thus be seen that plants can be easily and quickly pulled from the ground with but little effort on the part of the operator and without requiring him to bend over.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a base having an upwardly extending part and a horizontal part, a pair of horizontally arranged jaw members pivoted to the horizontal part of the base, a handle pivotally connected with the base and means connecting the lower end of the handle with the jaw members.

2. A device of the class described comprising a base having a flat front part and an upwardly curved rear part, a pair of jaw members pivoted to the front part, a brace connecting the upper end of the base with the front end thereof, a handle pivoted to the base, links connecting the handle with the inner ends of the jaw members and a spring for holding the jaw members in closed position.

In testimony whereof I affix my signature.

SIMON HAGOPIAN.